3,166,549
3,4-EPITHIOSTEROIDS
Taichiro Komeno, Sumiyoshi-ku, Osaka, Japan, assignor to Shionogi & Co., Ltd., Osaka, Japan
No Drawing. Filed Dec. 2, 1963, Ser. No. 327,482
Claims priority, application Japan, Dec. 29, 1962, 37/59,785
12 Claims. (Cl. 260—239.5)

The present invention relates to 3,4-epithiosteroids, and more particularly to 3,4-epithioandrostan-17β-ol and 17-acylates thereof.

The said 3,4-epithioandrostan-17β-ol and 17-acylates thereof are representable by the formula:

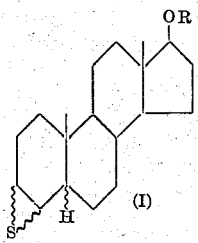

wherein R is hydrogen or lower alkanoyl (e.g. acetyl, propionyl, butyryl, valeryl) and the ripple mark (ⵑ) represents a generic indication of α- and β-configurations. These 3,4-epithiosteroids generally show pituitary gonadotrophin inhibiting activity.

Accordingly, a basic object of the present invention is to embody 3,4-epithioandrostan-17β-ol and 17-acylates thereof. Another object of this invention is to embody 3,4-epithiosteroids having pharmacological activity, i.e. pituitary gonadotrophin inhibiting activity. These and other objects will be apparent to those conversant with the art to which the present invention pertains from the subsequent description.

The objective episulfide (I) can be prepared from the corresponding epoxide substantially by three steps in which the conversions are representable by the following scheme:

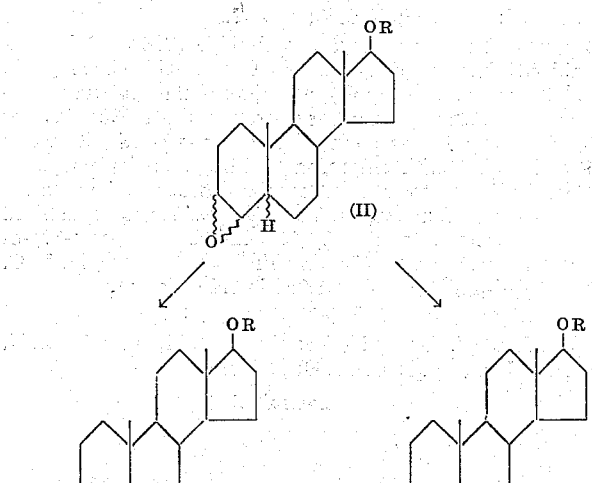

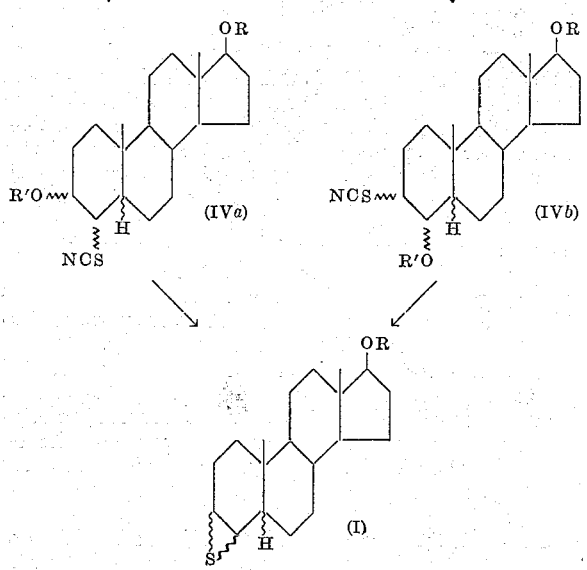

wherein R' is lower alkanesulfonyl (e.g. methanesulfonyl, ethanesulfonyl) or lower alkylbenzenesulfonyl (e.g. toluenesulfonyl, xylenesulfonyl) and R has the same significance as designated above.

In this connection, it should be understood that the above scheme represents the substantial conversions in the present invention. Practically, the hydroxyl group at the 17-position of the starting epoxide (II) is required to be protected as an acyloxy group, i.e. lower alkanoyloxy.

The starting steroids, i.e. 3,4-epoxyandrostan-17β-ol and 17-acylates thereof, are known or can be prepared by a per se conventional manner [e.g. Djerassi et al.: J. Am. Chem. Soc., 77, 4291 (1954); Akagi et al.: Chem. Pharm. Bull., 9, 464 (1961); Akagi: Chem. Pharm. Bull., 9, 470 (1961); Fieser et al.: J. Am. Chem. Soc., 75, 1704 (1953)]. Specific examples of the epoxide (II) are 3α,4α-epoxy-5α-androstan-17β-ol, 3α,4α-epoxy-5α-androstan-17β-ol 17-lower alkanoate, 3α,4α-epoxy-5β-androstan-17β-ol, 3α,4α-epoxy-5β-androstan-17β-ol 17-lower alkanoate, 3β,4β-epoxy-5α-androstan-17β-ol, 3β,4β-epoxy-5α-androstan-17β-ol 17-lower alkanoate, 3β,4β-epoxy-5β-androstan-17β-ol and 3β,4β-epoxy-5β-androstan-17β-ol 17-lower alkanoate.

According to the present invention, the starting epoxide (II) is first subjected to fission of epoxy linkage with thiocyanic acid. The reaction may be carried out by introducing thiocyanic acid gas produced by a conventional method [Buck et al.: Z. anorg. Chem., 77, 51 (1912)] into a solution of the epoxide (II) in a suitable solvent (e.g. benzene, carbon disulfide, dichloromethane, chloroform, carbon tetrachloride, ether) or adding the epoxide (II) to a solution of thiocyanic acid prepared in advance by shaking a salt of thiocyanic acid (e.g. sodium thiocyanate, potassium thiocyanate) with an acid (e.g. phosphoric acid) in a suitable solvent (e.g. benzene, carbon disulfide, dichloromethane, chloroform, carbon tetrachloride, ether, dioxane), followed by allowing the resultant mixture to stand at room temperature (10 to 30° C.) or heating the same on a water bath. Generally speaking, it takes a relatively long time for completion of the reaction and, therefore, excess of thiocyanic acid may be preferably employed.

The resulting thiocyanatohydrin (IIIa or IIIb) is then subjected to sulfonylation with a lower alkanesulfonylating agent (e.g. methanesulfonyl chloride, ethanesulfonyl chloride) or a lower alkylbenzenesulfonylating agent (e.g. toluenesulfonyl chloride, xylenesulfonyl chloride). The reaction can be accomplished by treating the thiocyanatohydrin (IIIa or IIIb) with the said sulfonylating agent in the presence of a condensing agent (e.g. pyridine, picoline, triethylamine) at room temperature (10 to 30° C.) or while ice-cooling.

The resultant sulfonylated thiocyanatohydrin (IVa or IVb) is then subjected to formation of epithio linkage with a basic agent. As the basic agent, there may be employed alkali metal hydroxide (e.g. sodium hydroxide, potassium hydroxide), alkaline earth metal hydroxide (e.g. calcium hydroxide, barium hydroxide), alkali metal hydride (e.g. lithium aluminum hydride, lithium borohydride, sodium borohydride) and alumina. The reaction can be performed by treating the sulfonylated thiocyanatohydrin (IVa or IVb) with the said basic agent in a suitable solvent (e.g. methanol, ethanol, ether, tetrahydrofuran, dioxane) at a wide range of temperature from room temperature (10 to 30° C.) to reflux temperature.

The thus produced episulfide (I) is actually protected as acyloxy, i.e. lower alkanoyloxy, at the 17-position. And, if desired, hydrolysis may be subsequently carried out by a conventional manner, e.g. treatment with an alkali metal hydroxide in a hydrous medium, in order to convert the lower alkanoyloxy group into a hydroxyl group.

Although the process of this invention is hereinbefore illustrated step by step, these steps may be executed successively without the isolation of the product in each step.

The objective episulfides, i.e. 3,4-epithioandrostan-17β-ol and 17-acylates thereof, are useful as pituitary gonadotrophin inhibiting agents. For instance, 3β,4β - epithio-5α-androstan-17β-ol produced inhibition of gonadotrophin hypersecretion at the dosage of 10 milligrams without showing concomitant androgenic response in the test using mice.

The following examples illustrate presently-preferred embodiments of the present invention.

Example 1

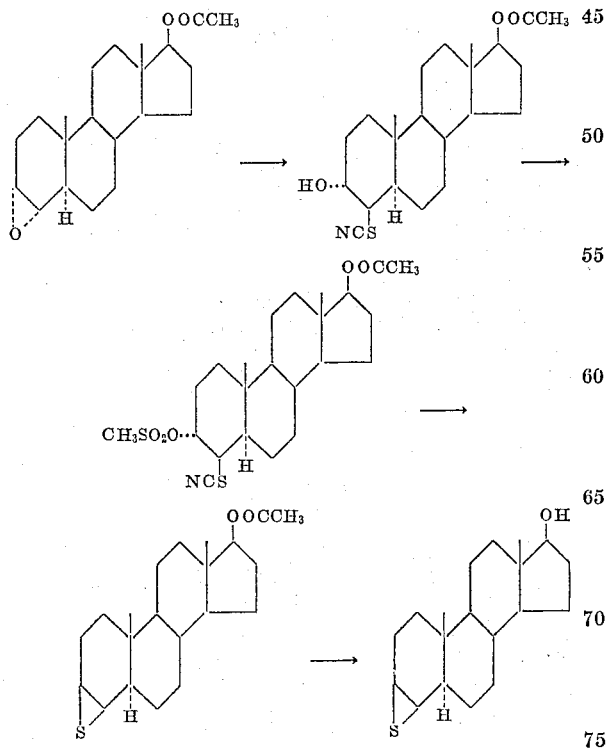

(A) 3α,4α - epoxy - 5α - androstan - 17β - ol 17-acetate [Fajkos et al.: Chem. listy, 52, 2115 (1958)] (1.023 g.) is dissolved in the etheral solution of thiocyanic acid prepared from potassium thiocyanate (6 g.), phosphoric acid (9 g.) and ether (30 ml.), and the resultant solution is allowed to stand at room temperature (10 to 30° C.) overnight. The reaction mixture is washed with 10% sodium carbonate and then water, dried over anhydrous sodium sulfate and the solvent evaporated. The residue is crystallized from a mixture of ether and petroleum ether to give 4β - thiocyanato - 5α - androstane - 3α,17β - diol 17-acetate (800 mg.) as leaflets melting at 192 to 194° C. $[\alpha]_D^{25.5}+1.9\pm2°$ (c.=0.963 in chloroform).

IR: $\nu_{max.}^{Nujol}$ 3523, 2169, 1733, 1239, 1039 cm.$^{-1}$

Anal. calcd. for $C_{22}H_{33}O_3NS$: C, 67.48; H, 8.50; N, 3.58; S, 8.19. Found: C, 67.78; H, 8.50; N, 3.63; S, 8.07.

(B) To a solution of the above prepared thiocyanatohydrin (800 mg) in pyridine (20 ml.), there is added methanesulfonyl chloride (1.0 ml.) while ice cooling, and the resultant mixture is allowed to stand overnight under ice cooling. The reaction mixture is combined with ice water and shaken with ether-chloroform (4:1). The organic solvent layer is washed with 10% sodium carbonate and water in order, dried over anhydrous sodium sulfate and the solvent evaporated. The residue is crystallized from a mixture of ether and petroleum ether and recrystallized from a mixture of acetone and hexane to give 3α-methanesulfonyloxy - 4β - thiocyanato-5α-androstan-17β-ol 17-acetate (964 mg.) as fine needles melting at 183 to 184° C. $[\alpha]_D^{21.5}-25.3\pm2°$ (c.=1.026 in chloroform).

IR: $\nu_{max.}^{Nujol}$ 2163, 1726, 1243, 1047, 1043, 1352, 1183 cm.$^{-1}$

Anal. calcd. for $C_{23}H_{35}O_5NS_2$: C, 58.82; H, 7.51; N, 2.98; S, 13.66. Found: C, 58.95; H, 7.31; N, 3.15; S, 13.97.

(C) The above prepared sulfonylated thiocyanatohydrin (510 mg.) is dissolved in a mixture of benzene and petroleum ether (1:1), poured onto alumina (15 g.), allowed to stand at room temperature (10 to 30° C.) for 48 hours and eluted with a mixture of benzene and petroleum ether. The eluate is concentrated under reduced pressure and the residue crystallized from acetone and recrystallized from a mixture of dichloromethane and acetone to give 3β,4β-epithio-5α-androstan-17β-ol 17-acetate (200 mg.) as flat needles melting at 178 to 180° C. $[\alpha]_D^{21}+30.2\pm2°$ (c.=1.011 in chloroform).

IR: $\nu_{max.}^{Nujol}$ 1734, 1252, 1049, 1034 cm.$^{-1}$

Anal. calcd. for $C_{21}H_{32}O_2S$: C, 72.36; H, 9.25; S, 9.20. Found: C, 72.55; H, 9.23; S, 9.02.

(D) The above prepared episulfide (200 mg.) is combined with a solution of potassium hydroxide (200 mg.) in 80% methanol (10 ml.), and the resultant mixture is allowed to stand at room temperature (10 to 30° C.) for 48 hours. The reaction mixture is combined with water and shaken with chloroform. The chloroform layer is washed with water, dried over anhydrous sodium sulfate and the solvent evaporated. The residue is crystallized from acetone to give 3β,4β-epithio-5α-androstan-17β-ol (104 mg.) as needles melting at 172 to 173° C. $[\alpha]_D^{27.5}+46.0\pm2°$ (c.=1.051 in chloroform).

IR: $\nu_{max.}^{Nujol}$ 3269 cm.$^{-1}$

Anal. calcd. for $C_{19}H_{30}OS$: C, 74.47; H, 9.87; S, 10.44. Found: C, 74.31; H, 10.00; S, 10.15.

Example 2

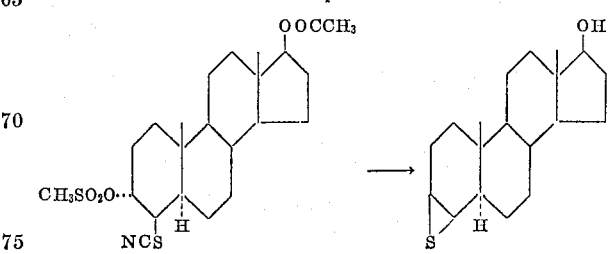

3α-methanesulfonyloxy-4β-thiocyanato-5α-androstan-17β-ol 17-acetate (200 mg.) obtained in Example 1 (B) is dissolved in a solution of potassium hydroxide (200 mg.) in diethyleneglycol dimethyl ether (6 ml.), and the resultant solution is stirred at room temperature (10 to 30° C.) for 41 hours. The reaction mixture is combined with water and shaken with chloroform. The chloroform layer is washed with water, dried over anhydrous sodium sulfate and the solvent evaporated. The residue is chromatographed on alumina and eluted with benzene. The benzene eluate is concentrated under reduced pressure and the residue crystallized from acetone to give 3β,4β-epithio-5α-androstan-17β-ol (74 mg.) as needles melting at 172 to 173° C.

*Example 3*

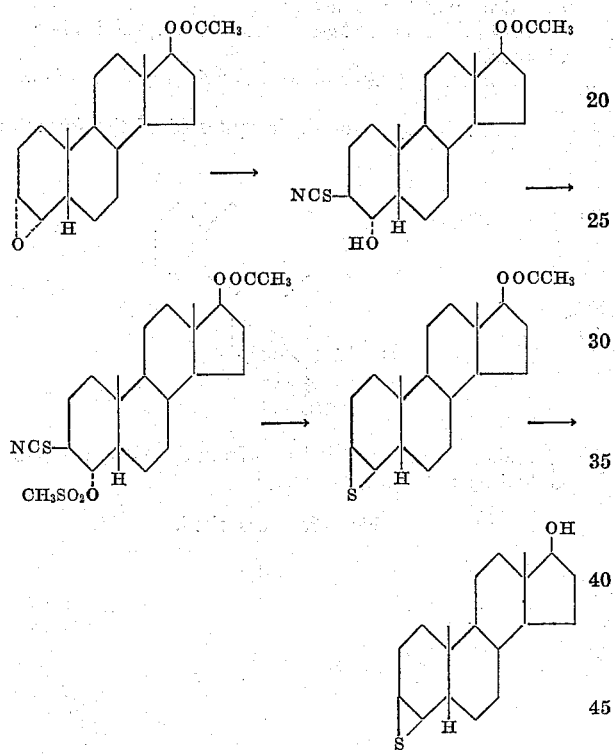

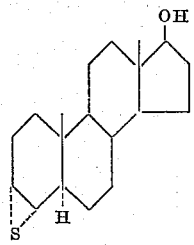

In the substantially same manner as in Example 1, 3α, 4α-epoxy-5β-androstan-17β-ol 17-acetate is converted into 3β,4β-epithio-5β-androstan-17β-ol through 3β-thiocyanato-5β-androstane-4α,17β-diol 17-acetate, 3β-thiocyanato-4α-methanesulfonyloxy-5β-androstan-17β-ol 17-acetate and 3β,4β-epithio-5β-androstan-17β-ol 17-acetate.

*Example 4*

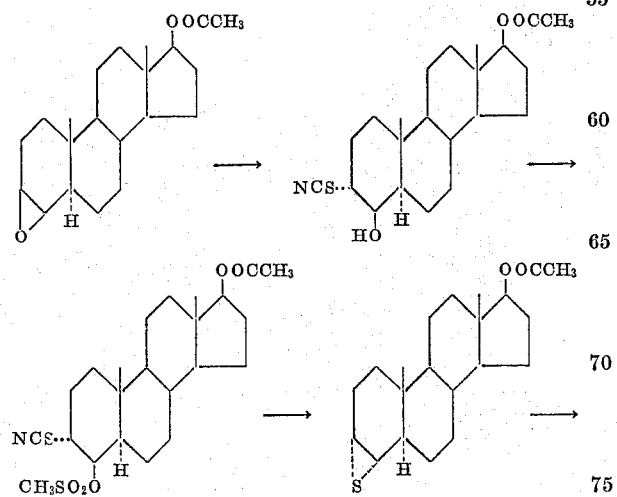

In the substantially same manner as in Example 1, 3β, 4β-epoxy-5α-androstan-17β-ol 17-acetate is converted into 3α,4α-epithio-5α-androstan-17β-ol through 3α-thiocyanato-5α-androstane-4β,17β-diol 17-acetate, 3α-thiocyanato-4β-methanesulfonyloxy-5α-androstan-17β-ol 17-acetate and 3α,4α-epithio-5α-androstan-17β-ol 17-acetate.

*Example 5*

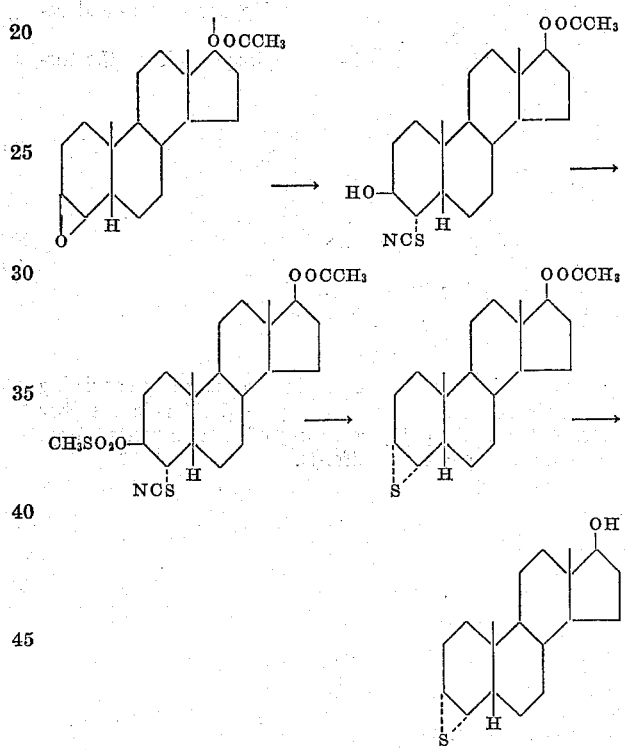

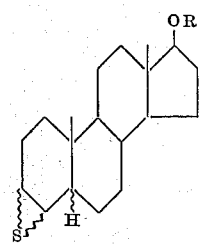

In the substantially same manner as in Example 1, 3β, 4β-epoxy-5β-androstan-17β-ol 17-acetate is converted into 3α,4α-epithio-5β-androstan-17β-ol through 4α-thiocyanato-5β-androstane-3β,17β-diol 17-acetate, 3β-methanesulfonyloxy-4α-thiocyanato-5β-androstan-17β-ol 17-acetate and 3α,4α-epithio-5β-androstan-17β-ol 17-acetate.

What is claimed is:
1. A 3,4-epithiosteroid of the formula:

wherein R is a member selected from the group consisting of hydrogen and lower alkanoyl.
2. 3β,4β-epithio-5α-androstan-17β-ol.
3. 3β,4β-epithio-5α-androstan-17β-ol 17-lower alkanoate.
4. 3β,4β-epithio-5α-androstan-17β-ol 17-acetate.

5. A 3-sulfonyloxy-4-thiocyanatosteroid of the formula:

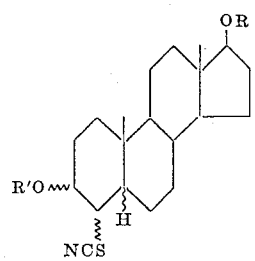

wherein R is a member selected from the group consisting of hydrogen and lower alkanoyl and R' is a member selected from the group consisting of lower alkanesulfonyl and lower alkylbenzenesulfonyl.

6. 3α-lower alkanesulfonyloxy-4β-thiocyanato - 5α-androstan-17β-ol 17-lower alkanoate.

7. 3α-methanesulfonyloxy-4β-thiocyanato - 5α - androstan-17β-ol 17-acetate.

8. A 3 - thiocyanato - 4 - sulfonyloxysteroid of the formula:

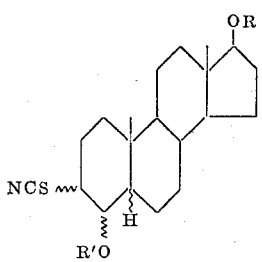

wherein R is a member selected from the group consisting of hydrogen and lower alkanoyl and R' is a member selected from the group consisting of lower alkanesulfonyl and lower alkylbenzenesulfonyl.

9. A 3-hydroxy-4-thiocyanatosteroid of the formula:

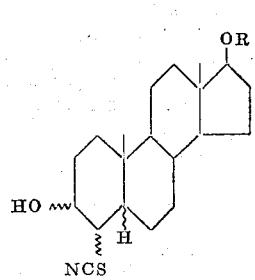

wherein R is a member selected from the group consisting of hydrogen and lower alkanoyl.

10. 4β-thiocyanato-5α-androstane-3α,17β-diol 17-lower alkanoate.

11. 4β-thiocyanato-5α-androstane-3α,17β-diol 17 - acetate.

12. A 3-thiocyanato-4-hydroxysteroid of the formula:

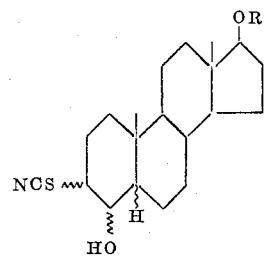

wherein R is a member selected from the group consisting of hydrogen and lower alkanoyl.

No references cited.